(12) United States Patent
Velhal et al.

(10) Patent No.: US 7,412,595 B2
(45) Date of Patent: Aug. 12, 2008

(54) CUSTOMIZATION OF ELECTRONIC DEVICES VIA PRE-BOOT SPACE

(75) Inventors: Ravindra Velhal, Beaverton, OR (US); Nikhil M. Deshpande, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 328 days.

(21) Appl. No.: 11/026,618

(22) Filed: Dec. 30, 2004

(65) Prior Publication Data

US 2006/0149955 A1 Jul. 6, 2006

(51) Int. Cl.
*G06F 9/00* (2006.01)
*G06F 9/24* (2006.01)

(52) U.S. Cl. ............... 713/1; 713/2; 713/100; 710/10; 710/104; 709/222

(58) Field of Classification Search ........ 713/1, 713/100, 2; 710/10, 104; 709/222
See application file for complete search history.

(56) References Cited

U.S. PATENT DOCUMENTS

| | | | | |
|---|---|---|---|---|
| 5,365,587 | A * | 11/1994 | Campbell et al. | 713/183 |
| 5,892,952 | A * | 4/1999 | Seko et al. | 717/174 |
| 6,519,659 | B1 * | 2/2003 | Stevens | 710/15 |
| 6,625,754 | B1 * | 9/2003 | Aguilar et al. | 714/15 |
| 6,851,073 | B1 * | 2/2005 | Cabrera et al. | 714/15 |
| 6,934,881 | B2 * | 8/2005 | Gold et al. | 714/15 |
| 7,082,523 | B2 * | 7/2006 | Zimmer et al. | 713/1 |
| 7,107,443 | B2 * | 9/2006 | Rhoades | 713/1 |
| 7,124,322 | B1 * | 10/2006 | Backman | 714/15 |
| 7,143,275 | B2 * | 11/2006 | Cepulis et al. | 713/1 |
| 7,197,541 | B1 * | 3/2007 | Skinner et al. | 709/216 |
| 7,219,257 | B1 * | 5/2007 | Mahmoud et al. | 714/6 |
| 2002/0099971 | A1 * | 7/2002 | Merkin et al. | 714/6 |
| 2002/0147938 | A1 * | 10/2002 | Hamilton et al. | 714/6 |
| 2003/0028628 | A1 * | 2/2003 | Irwin et al. | 709/222 |
| 2003/0177344 | A1 * | 9/2003 | Harvey | 713/1 |
| 2003/0204711 | A1 * | 10/2003 | Guess | 713/1 |
| 2004/0093607 | A1 * | 5/2004 | Elliott | 719/326 |
| 2004/0172578 | A1 * | 9/2004 | Chen et al. | 714/15 |
| 2004/0255106 | A1 * | 12/2004 | Rothman et al. | 713/1 |
| 2005/0166213 | A1 * | 7/2005 | Cromer et al. | 719/315 |
| 2006/0053272 | A1 * | 3/2006 | Roth et al. | 713/1 |

OTHER PUBLICATIONS

Korakis, T., Jakllari, G., and Tassiulas, L. 2003. A MAC protocol for full exploitation of directional antennas in ad-hoc wireless networks. In Proceedings of the 4th ACM international Symposium on Mobile Ad Hoc Networking &Amp; Computing (Annapolis Maryland, USA, Jun. 1-3, 2003). MobiHoc '03. ACM Press, New York, NY, p. 98.*
"Description of Microsoft Windows registry." http://support.microsoft.com/kb/256986. Sep. 29, 2004, p. 1.*

* cited by examiner

*Primary Examiner*—Thomas Lee
*Assistant Examiner*—Jaweed A Abbaszadeh
(74) *Attorney, Agent, or Firm*—Blakely, Sokoloff, Tayor & Zafman LLP

(57) ABSTRACT

Methods and apparatuses for maintaining customization information for an electronic device in an operating system independent component that may be accessed prior to completion of a boot up process to be used to provide customized functionality of the electronic device.

11 Claims, 4 Drawing Sheets

CUSTOMIZATION OF ELECTRONIC DEVICES VIA PRE-BOOT SPACE

TECHNICAL FIELD

Embodiments of the invention relate to customization of electronic devices. More particularly, embodiments of the invention relate to techniques that allow user interface customization to be accomplished using, at least in part, pre-boot functionality.

BACKGROUND

Currently, many electronic devices (e.g., computer systems, cellular telephones, personal digital assistants (PDAs), smart phones) allow a user to customize the user interface and other user preferences. Customization is accomplished through an operating system that manages the customization using various techniques known in the art. However, changes may be lost as a result of an operating system crash or upgrade. This may result in a disappointing user experience.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Figure 1:
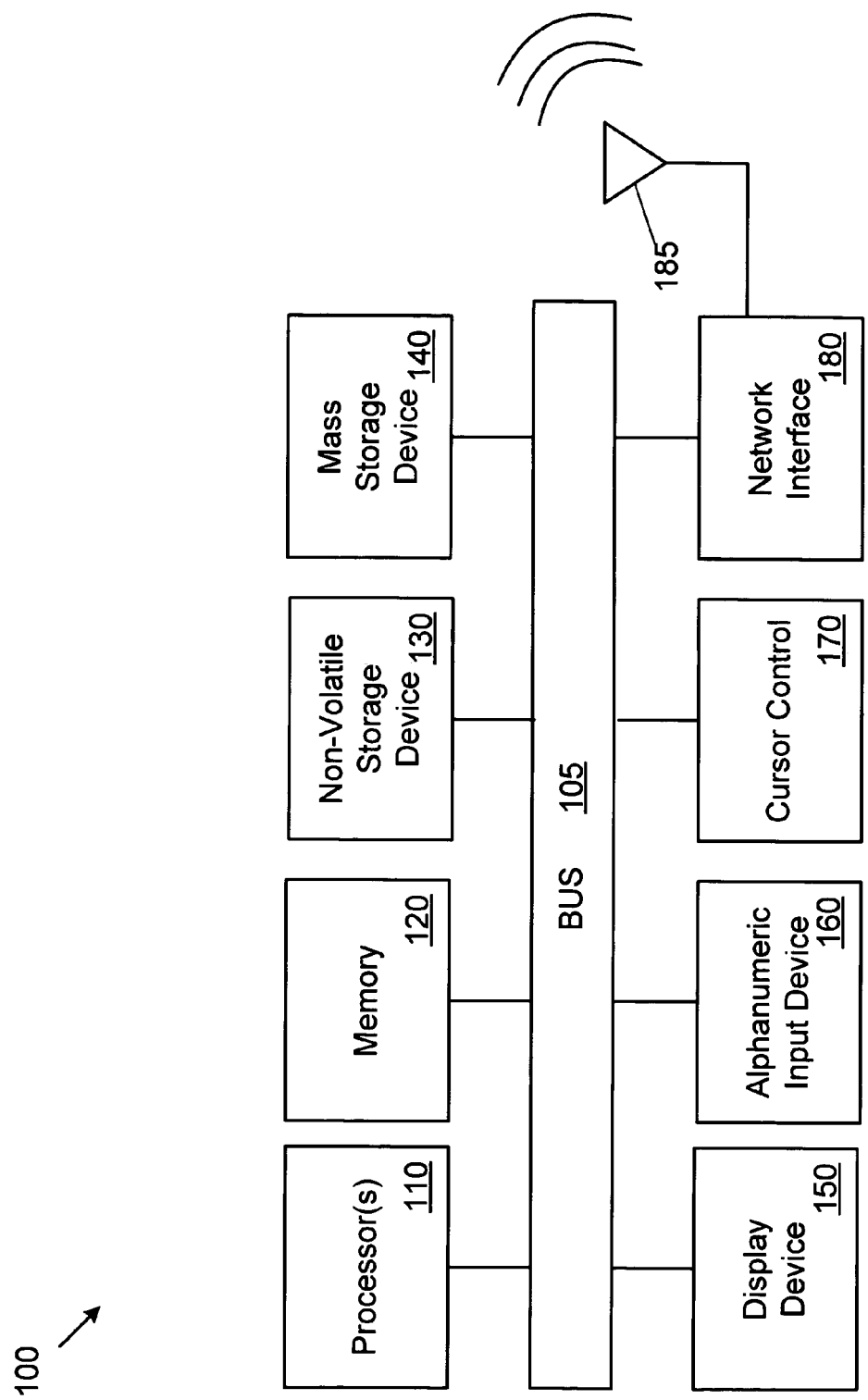
FIG. 1 is a block diagram of one embodiment of an electronic system.

FIG. 1 is a block diagram of one embodiment of an electronic system. The electronic system illustrated in FIG. 1 is intended to represent a range of electronic systems (either wired or wireless) including, for example, desktop computer systems, laptop computer systems, cellular telephones, personal digital assistants (PDAs) including cellular-enabled PDAs, set top boxes. Alternative electronic systems may include more, fewer and/or different components.

Electronic system 100 may include bus 105 or other communication device to communicate information, and processor 110 coupled to bus 105 that may process information. While electronic system 100 is illustrated with a single processor, electronic system 100 may include multiple processors and/or co-processors. Electronic system 100 further may include random access memory (RAM) or other dynamic storage device 120 (referred to as main memory), coupled to bus 105 and may store information and instructions that may be executed by processor 110. Main memory 120 may also be used to store temporary variables or other intermediate information during execution of instructions by processor 110.

Electronic system 100 may also include read only memory (ROM) and/or other static storage device 130 coupled to bus 105 that may store static information and instructions for processor 110. Data storage device 140 may be coupled to bus 105 to store information and instructions. Data storage device 140 such as a magnetic disk or optical disc and corresponding drive may be coupled to electronic system 100.

Electronic system 100 may also be coupled via bus 105 to display device 150, such as a liquid crystal display (LCD), to display information to a user. Alphanumeric input device 160, including alphanumeric and other keys, may be coupled to bus 105 to communicate information and command selections to processor 110. Another type of user input device is cursor control 170, such as a mouse, a trackball, or cursor direction keys to communicate direction information and command selections to processor 110 and to control cursor movement on display 150.

A user of electronic system 100 may customize electronic system 100 using the components discussed above. Customizations may include, for example, storing and/or setting of user passwords, application preferences, folder or file system preferences, network mapping settings, shared folders, firewall preferences, environment (e.g., home, office, mobile) settings, printer or other hardware preferences, browser favorites, desktop preferences, operating system preferences, screen saver preferences, location information. Additional customizations may include, for example, storing and/or setting of user group policies and privileges, device owner information, network policies, authentication information, asset tags, software licenses, cryptographic keys, project settings, contact lists, etc. Additional and/or different customizations may also be made.

Prior art customization is accomplished under operating system control. That is, the operating system provides and/or supports tools and applications that may allow a user to customize electronic system 100. However, if the operating system crashes, is otherwise lost or is upgraded, previously made customizations may be lost.

As described in greater detail below, customization information may be stored in pre-boot space that is independent of the operating system, which may allow the customizations to be maintained if the operating system is unavailable, damaged, or not loaded. In one embodiment, customization information is stored in a non-volatile storage device (e.g., may be part of non-volatile storage 130) that may be accessible if the system hard disk or other storage device (e.g., storage device 140) is not available. By storing customization information as described herein, transfer and recovery of customization information may be accomplished in an operating system-independent manner.

Electronic system 100 further may include network interface(s) 180 to provide access to a network, such as a local area network. Network interface(s) 180 may include, for example, a wireless network interface having antenna 185, which may represent one or more antenna(e).

In one embodiment, network interface(s) 180 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11 g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 180 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 2:
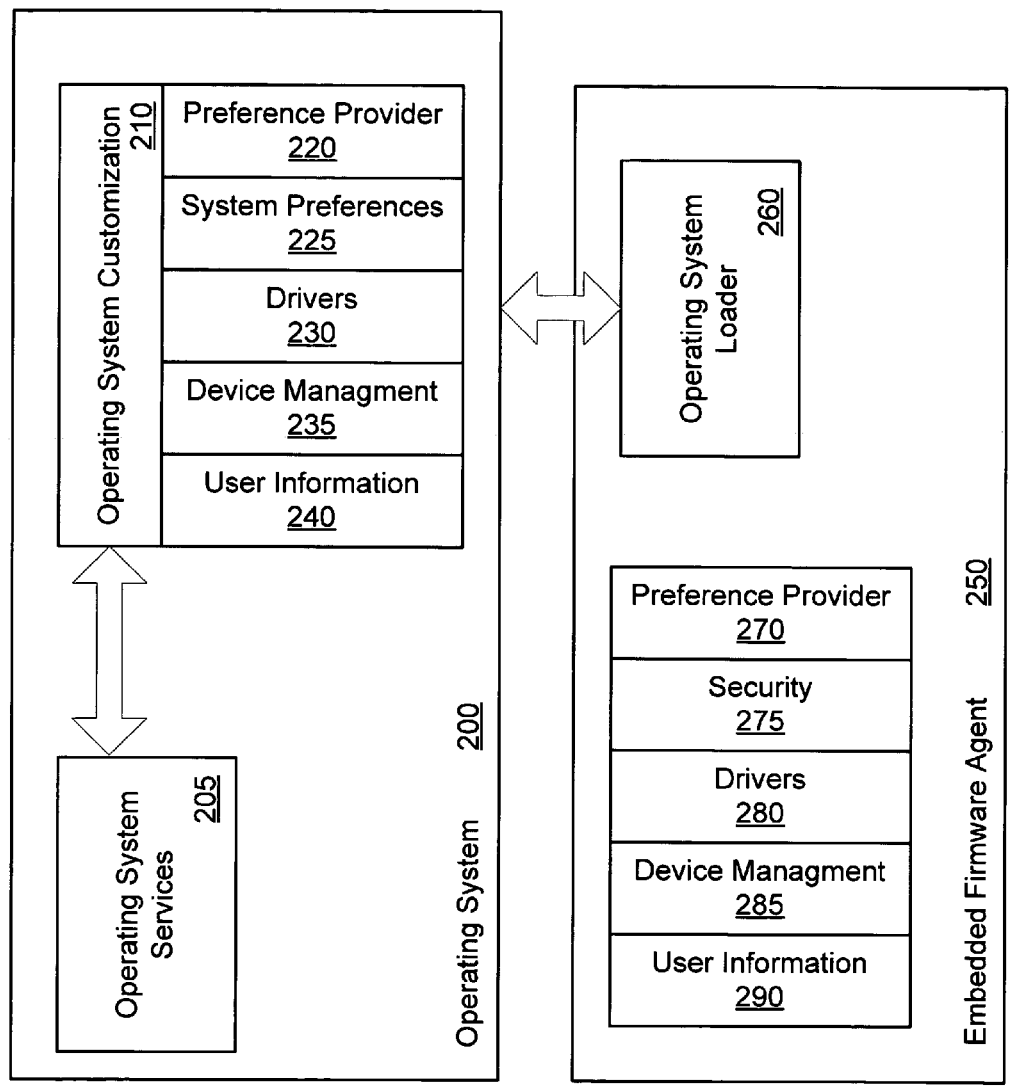
FIG. 2 is a conceptual block diagram of one embodiment of customization and management of an electronic device using a pre-boot environment.

FIG. 2 is a conceptual block diagram of one embodiment of customization and management of an electronic device using a pre-boot environment. The electronic device may include operating system 200, which may be stored in a dynamic memory system and/or a static memory system and executed by one or more processors (not shown in FIG. 2). In general, operating system 200 may be any type of operating system known in the art.

Operating system 200 may include operating system services 205, which may include, for example, software modules that allow operating system 200 to perform various functions including customization of the host electronic device. Operating system customization agent 210 may coordinate customization operations. Customization may be managed for various aspects of the electronic device by one or more sub-agents (e.g., preference provider 220, system preferences 225, drivers 230, device management 235, user information 240).

Operating system customization agent 210 (and/or any of the sub-agents) may communication changes made by a user to embedded firmware agent 250 via operating system loader 260. In one embodiment, embedded firmware agent 250 may be a mechanism that enables executable content in the form of one or more software drivers or other applications to be loaded and/or executed prior to, or independently of, operating system state. In one embodiment, drivers, applications and/or data supported by embedded firmware agent 250 may be loaded into the System Management Mode (SMM) of an Intel 32-bit family of microprocessor (i.e., IA-32 processors), or the native mode of an Itanium-based processor with PMI signal activation. The state of execution of code in IA32 SMM is initiated by an SMI signal and that in Itanium™ processors is initiated by PMI signal activation; for simplicity, these will generally be referred to as SMM. Embedded firmware agent may interact with other processors in a similar, operating system independent manner.

Drivers, applications and/or data supported by embedded firmware agent 250 may include, for example, preference provider 270, security agent 275, drivers 280, device management agent 285 and user information 290. Other and/or different drivers, applications or data may also be supported. In one embodiment, preference provider 270 may allow a user to perform customization operations through embedded firmware agent 250 rather than operating system 200. Operating system loader 260 may synchronize customizations performed using operating system 200 and embedded firmware agent 250.

Customizations may include, for example, storing and/or setting of user passwords, application preferences, folder or file system preferences, network mapping settings, shared folders, firewall preferences, environment (e.g., home, office, mobile) settings, printer or other hardware preferences, browser favorites, desktop preferences, operating system preferences, screen saver preferences, location information. Additional customizations may include, for example, storing and/or setting of user group policies and privileges, device owner information, network policies, authentication information, asset tags, software licenses, cryptographic keys, project settings, contact lists, etc. Additional and/or different customizations may also be made.

Figure 3:
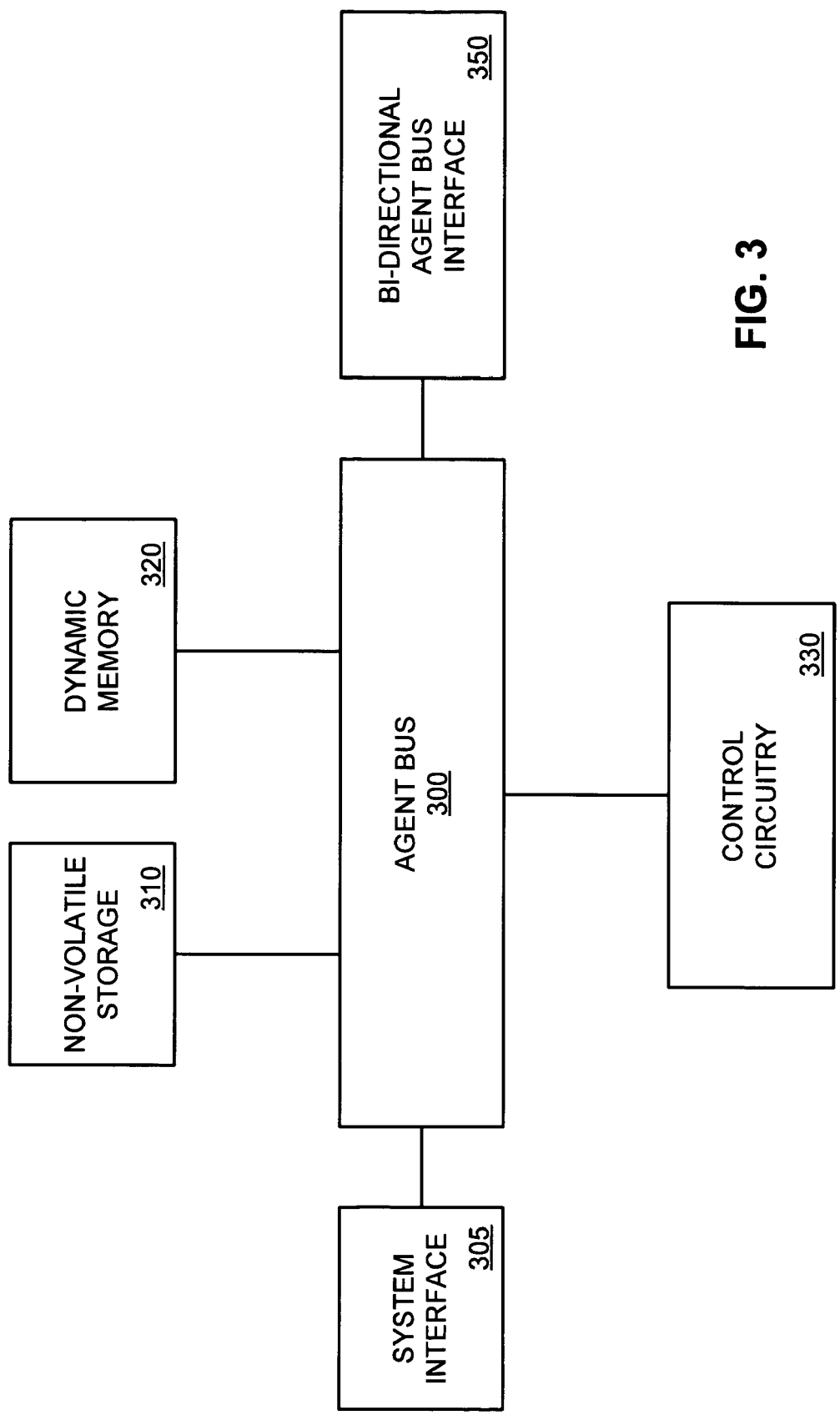
FIG. 3 is a block diagram of one embodiment of an embedded firmware agent.

FIG. 3 is a block diagram of one embodiment of an embedded firmware agent. In the example of FIG. 3 the embedded firmware agent may have an interface compliant with an Extensible Firmware Interface (EFI) as defined by the EFI Specifications, version 1.10, published Nov. 26, 2003, available from Intel Corporation of Santa Clara, Calif. In alternate embodiments, other firmware components can also be used.

In one embodiment, the embedded firmware agent may include agent bus 300 coupled with system interface 305. System interface 305 may provide an interface through which the embedded firmware agent communicates with the host system. In one embodiment, the embedded firmware agent further includes dynamic memory 310 that may be coupled with agent bus 300. Dynamic memory 310 may provide storage for instructions and/or data to be used during operation.

The embedded firmware agent may further include non-volatile storage 320 that may be coupled with agent bus 300 to store static data and/or instructions. In one embodiment, the embedded firmware agent may include control circuitry 330 coupled with agent bus 300 that may perform control operations and/or execute instructions provided by dynamic memory 310 and/or non-volatile storage 320.

Figure 4:
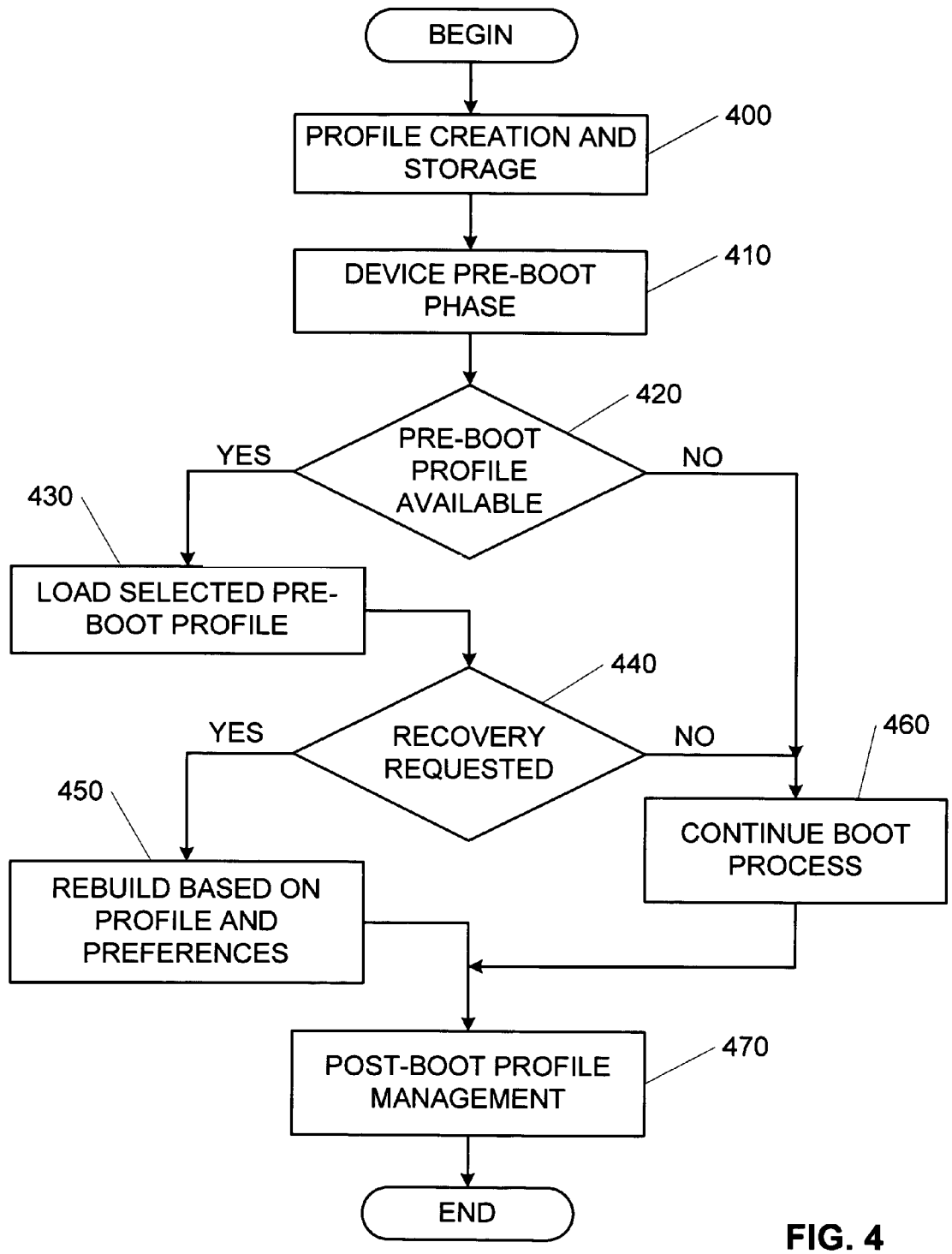
FIG. 4 is a flow diagram of one embodiment of operation of an electronic device that supports customization functionality using an operating-system independent system component.

FIG. 4 is a flow diagram of one embodiment of operation of an electronic device that supports customization functionality using an operating-system independent system component. The electronic device may be any type of electronic device including, for example, a cellular telephone, a personal digital assistant (PDA), a mobile computer, a desktop computer, a portable music device, a set top box, a digital video recorder (DVR), etc.

A user profile may be created and/or customized prior to initialization of the electronic device, 400. A user preference profile and/or other customization file may be created or modified through operation of, for example, an embedded firmware agent. In one embodiment, creation or modification of the preference profile may be performed in an operating system independent manner.

Customizations may be made by a user of the electronic device, by information technology (IT) personnel, an original equipment manufacturer (OEM), and/or any other party having the authority to modify the electronic device. As discussed above, customizations may also be made via the operating system after the electronic device has booted up and operates under operating system control.

The device pre-boot phase is completed, 410. Device pre-boot phase may include, for example, detection of available hardware and/or chip initialization. In one embodiment, using the EFI environment described above, a Firmware Services Environment (FSE) may be loaded. Other pre-boot operations may also be performed.

If the pre-boot user profile is available, 420, the selected pre-boot user profile may be loaded, 430. When the user profile is loaded, data from the user profile may be used to initialize drivers and/or applications based on previously stored customizations. The user profile may also cause selected data to be loaded or not loaded based on previously stored customizations. If the pre-boot user profile is not available, 420, the boot process may continue, 460, according to any manner known in the art.

If a recovery is requested, 440, one or more components of the electronic device may be rebuilt using the pre-boot user profile, 450. For example, if the operating system of the electronic device is unavailable or damaged, the pre-boot user profile may be used to cause a functional version of the operating system to be installed, which may also be customized based on the pre-boot user profile.

One embodiment of pre-boot device customization may be summarized in the following pseudo-code:

Precondition: User has previously established preferences and/or profiles that correspond to customizations or data to be recovered.

```
Preferences profile layer initialization
{
    User presets preferences and/or profiles for target device for
customizations and/or recovery for pre-boot phase
        Determine user profiles, preferences and/or data to be
        customized,
loaded and/or recovered
        Load user profiles into database of embedded firmware agent
        Create database mapping for profiles and actions
        corresponding to
user profile/preferences
}
Controller Execution
{
    Device boots up and profiles, preferences are loaded
    If select profile = True
    {
        Customize device based on profiles, preferences
    }
    Else
    {
        Continue to load OS
    }
    If recover device = True
    {
        Read user profile and preferences
        Rebuild OS (user initiated or remote rebuild) based on
        preferences
        Load applications and customize setting based on profile,
preferences
    }
}
```

The techniques and devices described above may be applicable in the following example scenarios. Additional scenarios may also be supported, as the following is not intended to be an exhaustive list. As a first example, electronic device and/or operating system customization may be based on user preferences that may be set in a pre-boot (pre operating system control) environment. For example, a user may configure an electronic device so that during the time that the operating system is loading a pre-selected interface may be provided (e.g., a picture of a loved ones rather than information related to boot operations). In addition to providing a more enjoyable boot sequence, the customization may provide increased security by not displaying information related to the boot sequence of the electronic device.

As another example, a user may set passwords, application preferences, folder settings, network mappings, browser settings, desktop setting and/or other customizations may be stored in pre-boot memory. In the event of an operating system crash, storage media crash or other failure that may otherwise result in loss of the customization data, customizations for multiple applications may be restored.

As a further example, a Web browser (either limited in functionality or fully-functional) that may have associated preferences (web favorites) may be supported in the pre-boot phase by the embedded firmware agent. These preferences (web favorites) may be used during both pre boot and post boot web browsing. Storage of customization data in pre-boot memory may allow the customization data to be transferred to another electronic device, which may allow a new device to be more quickly fully functional that may otherwise be possible.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   prior to completion of a boot operation for an electronic device and in a System Management Mode (SMM), retrieving customization information from a pre-boot accessible memory with an embedded firmware agent that is compliant with an Extensible Firmware Interface (EFI) standard and operates independently of a host operating system in response to a recovery request, wherein the recovery request comprises customization information to rebuild at least a portion of a component of the electronic device; and
   using the customization information to rebuild the component of the electronic device to modify functionality of the electronic device when under operating system control.

2. The method of claim 1 further comprising:
   receiving user-provided customization information when the electronic device is under operating system control;
   reconciling the retrieved customization information and the user-provided customization information;
   storing the reconciled customization information in the pre-boot accessible memory.

3. The method of claim 1 wherein the customization information comprises one or more of: user passwords, application preferences, folder preferences, file system preferences, network mapping settings, shared folders, firewall preferences, environment settings, printer preferences, hardware preferences, browser favorites, desktop preferences, operating system preferences, screen saver preferences, location information, user group policies, user group privileges, device owner information, network policies, authentication information, asset tags, software licenses, cryptographic keys, project settings and contact lists.

4. The method of claim 1 wherein the electronic device comprises a mobile electronic device.

5. An apparatus comprising:
   a memory to store an operating system kernel and an application;
   a firmware device to store an initialization sequence for an electronic device;
   a processor coupled with the memory and with the firmware device to perform the initialization sequence and to execute the operating system kernel and the application after performing the initialization sequence; and an embedded firmware agent that is compliant with an Extensible Firmware Interface (EFI) standard and is coupled with the processor to maintain customization information, wherein the embedded firmware agent provides the customization information to be accessible prior to completion of the initialization sequence in a System Management Mode (SMM) in response to a recovery condition;

wherein the processor uses the customization information to rebuild at least a portion of the operating system kernel in response to the recovery condition.

6. The apparatus of claim 5 wherein the customization information comprises one or more of: user passwords, application preferences, folder preferences, file system preferences, network mapping settings, shared folders, firewall preferences, environment settings, printer preferences, hardware preferences, browser favorites, desktop preferences, operating system preferences, screen saver preferences, location information, user group policies, user group privileges, device owner information, network policies, authentication information, asset tags, software licenses, cryptographic keys, project settings and contact lists.

7. The apparatus of claim 5 wherein the embedded firmware agent causes the processor to modify functionality of the operating system and the application based on the customization information.

8. The apparatus of claim 5 wherein the embedded firmware agent causes functionality of a subsequently installed operating system to be modified based on the customization information.

9. The apparatus of claim 5 wherein the customization information is received in an operating system independent manner.

10. The apparatus of claim 5 wherein the processor receives customization information via the operating system after completion of the initialization sequence and transmits the received customization information to the embedded firmware agent, and further wherein the embedded firmware agent reconciles the received customization information with previously stored customization information.

11. The apparatus of claim 5 further comprising a substantially omni-directional antenna coupled with the processor.

\* \* \* \* \*